(12) United States Patent
Soni

(10) Patent No.: US 6,684,323 B2
(45) Date of Patent: Jan. 27, 2004

(54) VIRTUAL CONDITION CODES

(75) Inventor: Naresh H. Soni, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/179,783

(22) Filed: Oct. 27, 1998

(65) Prior Publication Data

US 2002/0194458 A1 Dec. 19, 2002

(51) Int. Cl.$^7$ .................. G06F 9/06; G06F 13/16; G06F 13/40
(52) U.S. Cl. .............. 712/226; 712/248; 712/229; 710/305; 710/244
(58) Field of Search .................. 712/229, 234, 712/245, 42, 32, 33, 30, 241, 226, 223, 233, 228, 218, 227, 248; 708/672; 711/220, 200, 147; 710/129, 244, 49, 50, 305; 709/331; 714/48, 49; 717/135

(56) References Cited

U.S. PATENT DOCUMENTS

| | | | |
|---|---|---|---|
| 4,217,638 A | * 8/1980 | Namimoto et al. | 711/220 |
| 4,794,517 A | * 12/1988 | Jones et al. | 712/32 |
| 5,410,721 A | * 4/1995 | Divine et al. | 712/245 |
| 5,551,051 A | * 8/1996 | Siverthorn et al. | 709/107 |
| 5,812,848 A | * 9/1998 | Cohen | 709/331 |

* cited by examiner

Primary Examiner—Daniel H. Pan
(74) Attorney, Agent, or Firm—Lisa K Jorgenson; William A. Munck

(57) ABSTRACT

The present invention utilizes a "virtual" condition code (VCC) which can control the instruction sequence in a microprocessor. The virtual condition code is stored in an internal, non-architected register that is not visible to the programmer, but is used by various microprocessor instructions to determine when a branch is to be taken. For example, the virtual condition code can be used as a condition for branching out of a series of repetitive instructions. The virtual condition code (VCC) can eliminate a portion of the processing overhead used when determining whether a sequential number, such as a count value in a register associated with a repetitive instruction, e.g. a LOOP, is zero. In accordance with one aspect of the present invention, a LOOP instruction will decrement a count value in a register (to maintain compatibility with the ISA). However, a corresponding branch instruction will use the virtual condition code, rather than checking the contents of the entire register, to determine whether or not to branch. In this manner, the present invention improves performance by minimizing the amount of hardware resources (i.e. compare logic) utilized while maintaining compatibility with the Intel architecture since the programmer visible condition code is not used. By leaving the programmer visible condition codes unchanged, the software is not forced to save and restore the register contents during each iteration.

47 Claims, 2 Drawing Sheets

VIRTUAL CONDITION CODES

BACKGROUND OF THE INVENTION

1. Field of the Invention

The present invention relates to increasing the speed and efficiency of a microprocessor while maintaining its compatibility with the instruction set architecture. More particularly, the present invention is a technique for decreasing the amount of processing resources needed to execute particular microprocessor instructions. A "virtual" condition code (VCC) is provided in a non-architected register and is available for use by various instructions that depend upon the occurrence of a specific event. By using the virtual condition code, the programmer visible codes in a flags register, or condition register are unaffected, thereby maintaining compatibility with the instruction set architecture.

2. Description of Related Art

In the computer industry there is a constant demand for ever faster and more efficient systems. Computer processing efficiency is largely dependent on the speed and resource utilization of the microprocessor that controls the basic functions of the computer system. Those microprocessors manufactured by the Intel Corporation execute a specific microprocessor instruction set architecture (ISA). Other Intel (ISA) compatible microprocessors include those manufactured by Advanced Micro Devices, Inc., National Semiconductor and others. These Intel ISA microprocessors command a huge percentage of the marketplace and have caused a correspondingly large amount of software to be written for them. Due to this large amount of Intel ISA software, microprocessor developers cannot change the programmer visible aspects of the instruction set, since it may cause this large quantity of existing software (legacy software) to become inoperable.

Therefore, a challenge to microprocessor developers has been to improve the efficiency of the microprocessor without changing the manner in which the ISA is implemented on the processor. For example, many instructions in the Intel architecture require sub-operations to be performed before the instruction can be completed. If the number of sub-operations, i.e. micro-ops, can be minimized or their performance optimized, without changing the ISA or programmer visible registers, then performance of the microprocessor can be enhanced.

Typically, some instructions in the ISA, such as a LOOP, $LOOP_{cc}$, REP, REPE, REPNE instruction will decrement a value in a register, such as a general purpose register (GPR) or the like. For example, each time the LOOP instruction is executed a count register is decremented and checked for zero. If the count equals zero, then the loop is terminated and program execution continues with the instruction following the LOOP. When the count is not zero, a jump (branch) is performed to a destination operand or instruction at a target address, usually the first instruction in the loop. The LOOP instruction does not modify the programmer visible condition code(s) in the flags register. The LOOP instruction will decrement a count register (ECX or CX) and then perform a comparison to see if the value is equal to zero. Whether the ECX or CX register is used depends on the size of the address. For 32 bit applications ECX is used and for 16 bit applications CX is used. Thus, the comparison operation will need to check at least 16 and possibly 32 locations which requires significant processing resources, such as hardware logic needed to perform the actual compare function.

The $LOOP_{cc}$ instruction also decrements the ECX/CX register and compares the decremented value to zero, but allows the loop to be exited early by checking a condition code in the flags register. In either case, the compare logic is required to check the decremented value in the ECX/CX register with zero.

The Intel ISA does not allow the flags register to be set/reset by the LOOP, $LOOP_{cc}$ repeat instructions because the software (OS and/or application) would be required to check the condition code in the flags register during each loop. Since the ECX register is 32 bits, a loop could include $2^{32}$ iterations and place a substantial burden on the software. The CX register is 16 bits and could include $2^{16}$ iterations.

Further, if the flags register is set/reset during each iteration, the programmer (operating system and/or application) would be forced to save and then restore the register contents for each iteration in the loop.

Thus, in conventional systems there are competing requirements that tend to work against one another. That is, Intel ISA repetitive instructions (LOOP and REP) are not allowed to update and use the more efficient condition codes in the flags register since it would require the program to save/restore after each iteration. Further, by not being allowed to use the condition codes in the flags register, the repetitive instructions must then use less efficient techniques to determine when to exit the loop, i.e. checking the 32 bit ECX register.

Therefore, it can be seen that a need exists for a microprocessor that executes the Intel instruction set architecture and maintains compatibility with software written for the Intel ISA, while efficiently executing those instructions using less hardware resources.

In particular it would be advantageous for a microprocessor to be able to check a condition code, rather than a 32 bit register, to determine whether to exit a set of repetitive instructions. And, at the same time maintaining the program visible condition codes in the flags register to prevent the need for the software to save/restore the register contents after each iteration.

SUMMARY OF THE INVENTION

In contrast to the prior art, the present invention utilizes a "virtual" condition code (VCC), stored in an internal, non-architected register, which can control the instruction sequence in a microprocessor.

Broadly, the present invention utilizes a virtual condition code that is not visible to the programmer, but is used by various microprocessor instructions to determine when a branch is to be taken. For example, the virtual condition code can be used as a condition for branching out of a series of repetitive instructions. The virtual condition code (VCC) can eliminate a portion of the processing overhead used when determining whether a sequential number, such as a count value in a register associated with a repetitive instruction, e.g. a LOOP, is zero. In accordance with one aspect of the present invention, a LOOP instruction will decrement a count value in a register (to maintain compatibility with the ISA). However, a corresponding branch instruction will use the virtual condition code, rather than checking the contents of the entire register, to determine whether or not to branch. In this manner, the present invention improves performance by minimizing the amount of hardware resources (i.e. compare logic) utilized while maintaining compatibility with the Intel architecture since the programmer visible condition code is not used. By leaving the programmer visible condition codes unchanged, the software is not forced to save and restore the register contents during each iteration.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1:
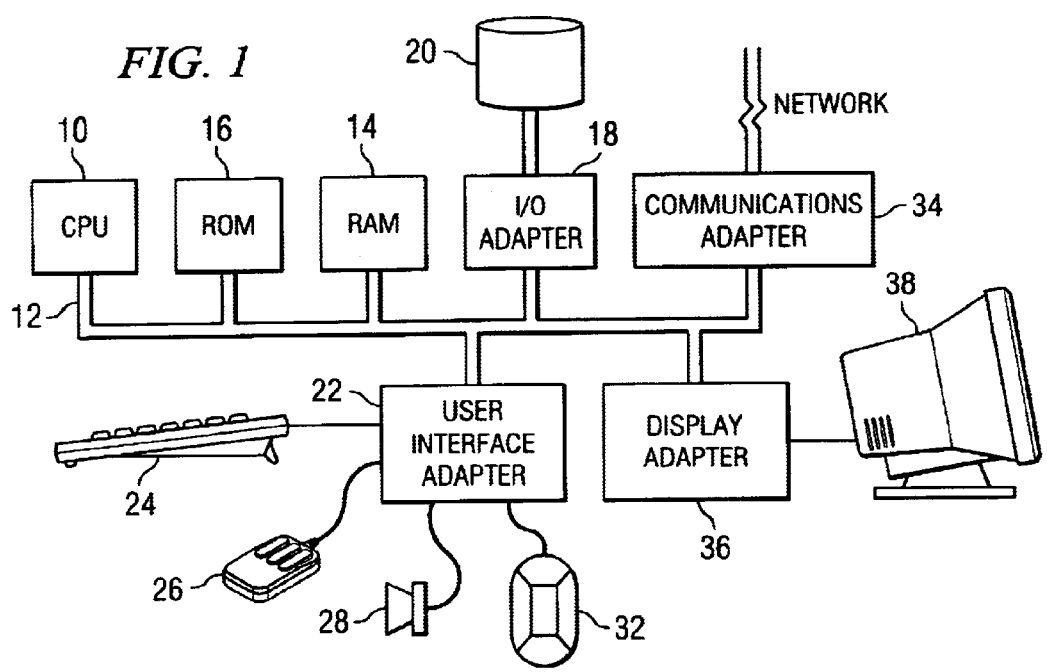
FIG. 1 is a block diagram of a data processing system capable of using a microprocessor embodying the present invention.

Referring to FIG. 1, a typical data processing system is shown which may be used in conjunction with the present invention. A central processing unit (CPU) 10 such as the Pentium II microprocessor, commercially available from Intel Corp. is provided and interconnected to the various other components by system bus 12. Read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing system to communicate with other such systems, via the Internet, local area network (LAN), or the like. Input/output devices are also connected to system bus 12 via user interface adapter 22 and display adapter 36. Keyboard 24, track ball 32, mouse 26 and speaker 28 are all interconnected to bus 12 via interface adapter 22. Display monitor 38 is connected to system bus 12 by display adapter 36. In this manner, a user is capable of inputting to the system through the keyboard 24, track ball 32, or mouse 26 and receiving output from the system via speaker 28 and display 38. Additionally, an operating system, such as one of the versions of Windows, commercially available from Microsoft Corporation is used to coordinate the functions of the various components shown in FIG. 1.

Figure 2:
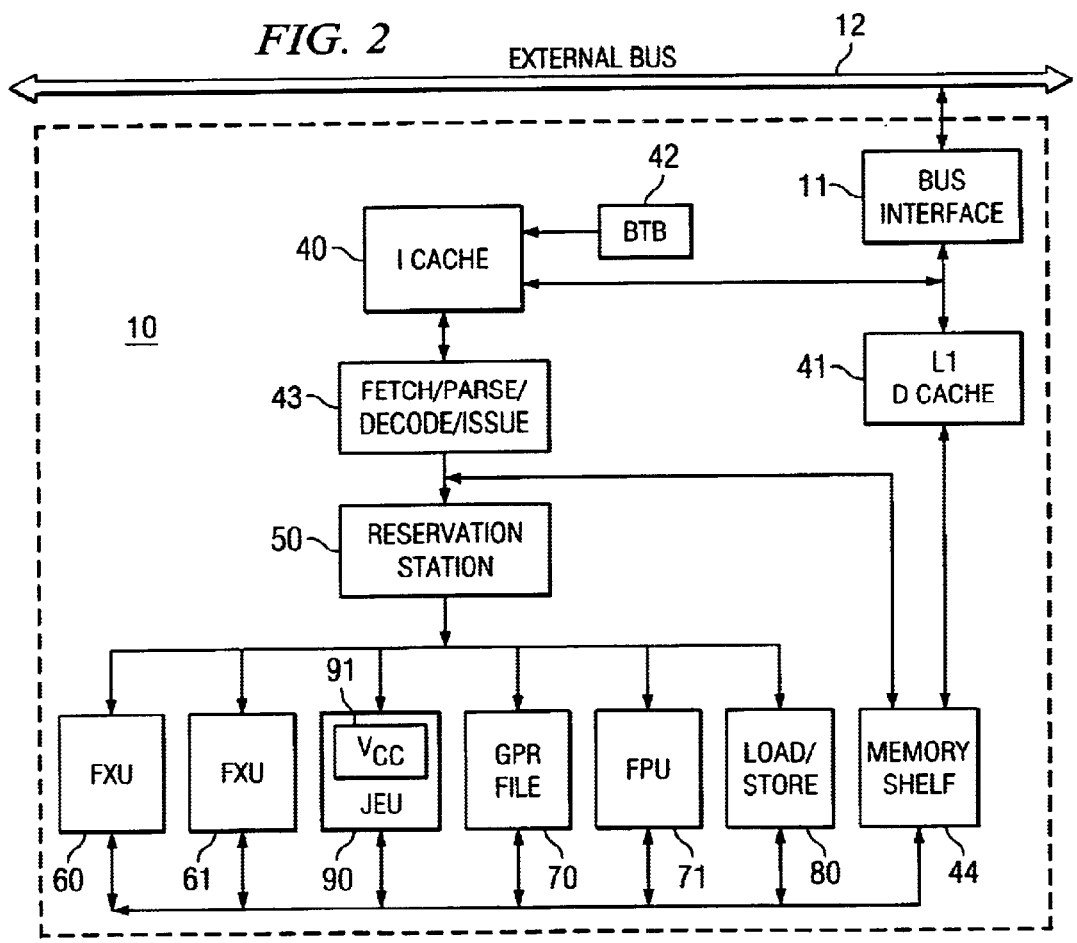
FIG. 2 is a block diagram of a microprocessor that includes the internal register which is used to store the virtual condition code of the present invention.

In FIG. 2, bus 12 is shown and which is considered to be external of microprocessor 10. It should be noted that for the sake of simplicity, microprocessor 10 will also be interchangeably referred to herein as CPU 10.

Bus interface unit (BIU) 11 interfaces the microprocessor components with system bus 12. Main memory 14 and the various input/output devices 26, 28, 32, via adapter 22, are also connected to bus 12. Control, address and data information is transmitted from microprocessor 10 onto bus 12 via BIU 11. Further, control, address and data signals from memory 14 and I/O adapter 22 are received by BIU 11 for use by microprocessor 10. It should be noted that the control, address and data information will include microprocessor instructions, as well as operand data which will be manipulated by the instructions. In addition to the receipt of information by microprocessor 10, BIU 11 will provide results of the execution of microprocessor instructions back to the software.

Microprocessor 10, like most modern microprocessors, includes a hierarchical memory subsystem. The memory subsystem usually includes a level one (L1) instruction cache 40 and L1 data cache 41 which provide the instructions and data to the execution units (FPU 71, Integer Unit 60, 61, Jump Execution Unit 90, Load/Store Unit 80 and the general purpose register file 70). In many data processing systems, an off chip level two (L2) cache (not shown) is provided. While an L2 cache is smaller than main memory 14, retrieving information likely to be used by the processor from an L2 cache is much faster than loading the information from main memory. Main memory 14 is the last level of storage in the memory system. Memory 14 is the largest storage area, but also requires the greatest number of cycles to be accessed by the microprocessor.

More particularly, L1 instruction cache 40 is included in microprocessor 10, as shown in FIG. 2. After retrieving the instructions from main memory 14, cache 40 stores these microprocessor instructions that will be provided to the microprocessor execution units.

An L1 data cache 41 is provided, as shown in FIG. 2, and may be configured to run in write-through mode, write-back mode, or the like. Write-through cache architectures require that all writes to the cache also update external memory simultaneously. A write-back architecture allows data to be written to the cache without updating external memory. With a write-back cache external write cycles are only required when a cache miss occurs, a modified line is replaced in the cache, or when an external bus master requires access to data. Typical L1 data caches use a four-way set associative architecture and a least recently used (LRU) algorithm. Depending on the cache architecture, the line size of cache 41 may be 8 bytes, 16 bytes, 32 bytes, or the like, and new lines are only allocated during the memory read cycles. Valid status is then maintained on a 16 byte cache line basis, but modified or "dirty" status for write-back mode is maintained on a 4-byte (double word) status. Therefore, only the double words that have been modified are written back to main memory when a line is replaced in the cache. The CPU can access the cache in a single internal clock cycle for both reads and writes. As noted above, instructions and data are stored separately in the L1 cache in order to increase performance.

Memory shelf 44 is essentially a memory queue that stores instructions and data after it has been received from the memory subsystem and prior to it being written from the execution units to the memory subsystem. Memory shelf 44 also includes a snooping mechanism that ensures coherency of data throughout the memory subsystem.

A branch target buffer 42 is used to predict the target address of control transfer instructions such as a "branch" or "jump" instruction. That is, the target address is precalculated (predicted) and stored in buffer 42. Thus, when an unconditional branch is taken, or a conditional branch instruction is encountered, the address for the next (non-sequential) instruction is already known and available for use by the corresponding execution unit (e.g. floating point or integer).

For example, a Pentium type microprocessor uses dynamic branch prediction. As each prefetched instruction is passed into the dual instruction pipelines, the memory address it was fetched from is used to perform a lookup in the BTB 42, which is a high-speed lookaside cache. If there is a branch and it misses BTB 42, it is predicted as not taken and the prefetch path is not altered. If a hit occurs in the BTB 42, then the state of history bits in BTB 42 are used to determine whether the branch should be predicted as taken or not taken. When the branch is executed, its results (whether it was taken or not and, if taken, the branch target address) are used to update BTB 42. The branch target buffer makes its predictions on the basis of basic blocks, i.e. block size, block type, target address and whether the branch will be taken or not taken. If the branch is incorrectly predicted, the instructions in the pipeline(s) and those which are currently-active and have been prefetched, must be flushed.

Instruction cache 40 is connected to an instruction fetch/parse/decode/issue unit 43 and provides the microprocessor instructions to reservation station 50 and ultimately to execution units 60, 61, 71, 80 and 90.

As noted by its name fetch/parse/decode/issue unit 43 performs several functions. First, it retrieves the instructions and loads them into an internal buffer by "prefetching" them from the instruction stream prior to their being fetched. As the fetched instructions are dispatched through the pipeline, new instructions are loaded into the buffer. This ensures that the execution units will always have a continuous supply of instructions and prevents any "bubbles" from occurring in the pipeline. Unit 43 also parses the complex instruction set computer (CISC) instructions into segments and identifies boundaries between the individual instructions. The parsed instructions are then decoded into reduced instruction set computer (RISC) instructions, or micro-ops, which are then placed in a decoded instruction queue to be subsequently issued to the execution units. It should be noted that in some cases the CISC instructions will be translated into more than one RISC instruction. However, in other cases one CISC instruction will correspond to a single RISC instruction.

As noted above, in addition to being fetched by unit 43, the instructions are also decoded and issued, or dispatched. From the fetch/parse/decode/issue unit 43, the instructions are then provided to reservation station 50 which provides instructions to the six (6) execution units. Reservation station 50 may be, for example, approximately 20–24 entries deep and will store instructions which are awaiting execution on one of the execution units.

The microprocessor of FIG. 2 shows six (6) execution units and includes two (2) fixed point units (FXU) having reference numerals 60, 61 respectively, which may also be referred to herein as integer units (IU). Integer instructions, such as add (ADD), multiply (IMUL), move (MOV) and the like are also issued by unit 43 to integer units 60, 61. In addition to executing other fixed point instructions and performing integer calculations, Integer units 60, 61 may perform address calculations for the load and store instructions.

Floating point unit 71 (FPU) perform the floating point operations and calculations that are often required for scientific and technical applications. Additionally, the floating point units execute the multimedia extensions (MMX) to the Intel architecture. Floating point unit 71 receives the issued floating point instructions from unit 43 for execution thereon. The floating point unit 71 includes eight 80 bit registers with a 64 bit interface which are capable of parallel execution. The exemplary Intel architecture floating point unit 71 uses the x87 instruction set and is compatible with IEEE standard 754.

Load/store unit 80 is also included which is responsible for executing the load instructions which provide information (data and instructions) from the memory system to the microprocessor pipeline. Store instructions are also included which write information from the microprocessor to the memory system. For example, load/store instructions are issued to load/store unit 80 for execution and memory address calculation, and to memory shelf 44, which may include a memory control unit, or the like, for scheduling. Load/store functions are implemented by load/store unit 80 which executes load and store instructions on one or more arithmetic logic units (ALU). Load/store unit 80 may include separate ALUs for load and store instructions. Load and store instructions include load string (LODS), load task register (LTR), move data (MOV), and the like. Store instructions include store task register (STR), store string (STOS), and the like. Generally, load instructions retrieve data and/or instructions from cache/memory and place the information in one of the microprocessor registers, while store instructions place data and/or instructions into a cache/memory location from the microprocessor registers. In some cases integer units 60, 61 may be used to perform memory address calculations.

A jump execution unit (JEU) 90 is also shown in FIG. 2, which is also often referred to as a branch execution unit. Jump execution unit 90 will process control transfer instructions such as branches, jumps and moves. Typically, when a jump instruction is encountered, JEU 90 will evaluate a condition code and jump to an out of sequence instruction based upon the state of the condition. In some cases the jump will occur if the condition is true, other times a branch will be taken when the condition is false. If the condition is such that the branch is not taken, then execution of instructions will continue sequentially. A typical jump, or branch instruction will include an opcode that describes the type of instruction, e.g. branch conditional, branch conditional to count register, delayed branch, jump on equal/zero, jump on not overflow, jump on parity even, or the like. The instruction also includes a field that specifies which bit in a condition register, or flag register (in the case of Intel architecture) is to be used for the condition of the jump, or branch. The target address is also included in the instruction such that if the condition is met, then the instruction stream jumps to the specified address for next instruction to be executed.

The condition codes are bits in the condition register or flag register that are set during execution of other instructions. Generally, the condition codes include greater than, less than, equal to or overflow. When, for example, a compare instruction (CMP) is executed the "equal to" bit will be set to logical 1 when the contents of two registers are equal. The next jump on equal (JE) instruction will then look at the equal bit. If the "equal to" bit is a one, indicating that the contents of the compared registers were equal to one another, then the jump is taken and the next instruction is fetched from the target address in the jump instruction. If the equal bit is a logical zero, then the jump is not taken and the next sequential instruction after the jump instruction is executed. In one preferred embodiment of the present invention the virtual condition code is stored in a non-architected register 91 in jump execution unit 90. This internal register will store the one-bit virtual condition code for use by a LOOP instruction, or the like. It should be noted that the present invention contemplates the virtual condition code being physically located in other areas of microprocessor 10.

The general purpose register file 70 is also shown in FIG. 2 and includes the general purpose registers (GPR) which are used by the application programmer to manipulate data structures and to hold the results of logical and arithmetic operations. The GPRs are all visible to the programmer (architected). That is, the operating system and/or application software written for the Intel ISA is capable of identifying and using the contents of the general purpose registers. In Intel ISA compatible microprocessors there are eight (8) GPRs: four (4) data registers (EAX, EBX, ECX, EDX); two (2) index registers (ESI, EDI) and two (2) pointer registers (ESP, EBP).

Memory management is provided by calculating a physical address from an effective address using a particular addressing mode. The CPU then uses the physical address to actually address specific locations in the physical memory device(s). A memory management unit may include a translation lookaside buffer, which is a cache for the paging mechanism. In a typical microprocessor, similar to the one shown in FIG. 2, the translation lookaside buffer (TLB) is a page table cache that automatically keeps the most commonly used page table entries in the processor. An address calculation unit is also provided for memory management operations and is used to calculate the physical address by computing an offset address (effective address). Generally, the effective address is calculated by adding together up to three values: a base, an index and a displacement. The base, if present, is the value in one of the 32 bit general registers at the time of the execution of the instruction. The index is also a value contained in one of the 32 bit general purpose registers. The index differs from the base in that the index is first multiplied by a scale factor of 1, 2, 4 or 8 before the summation is made. The third component added to the memory address calculation is the displacement, which is a value of up to 32 bits supplied as part of the instruction.

For additional information see the Intel Architecture Software Developer's Manual, Volume 2, Instruction Set Reference, published by Intel Corp., 1997; and Pentium Pro and Pentium II System Architecture, second edition, published by MindShare, Inc., 1998.

Most microprocessor architectures include some type of branch instructions that end a set of iterative operations (loop). It is often the case where the same set of instructions may be executed numerous times using different data, e.g. multiplying using multiple add and shift instructions. Microprocessor architectures have developed various instructions to address this issue. For example the PowerPC architecture (PowerPC is a trademark of IBM Corporation) uses a branch conditional to count register (BCCTR) instruction which decrements a counter and then branches based on the decremented value. The Intel ISA includes a LOOP instruction that uses one of the general purpose registers (ECX) as a counter and exits the loop when the value in the ECX register is equal to zero. Other repetitive type instructions, such as the repetitive load string (REP LODS) in the Intel ISA operate in a similar manner.

Figure 3:
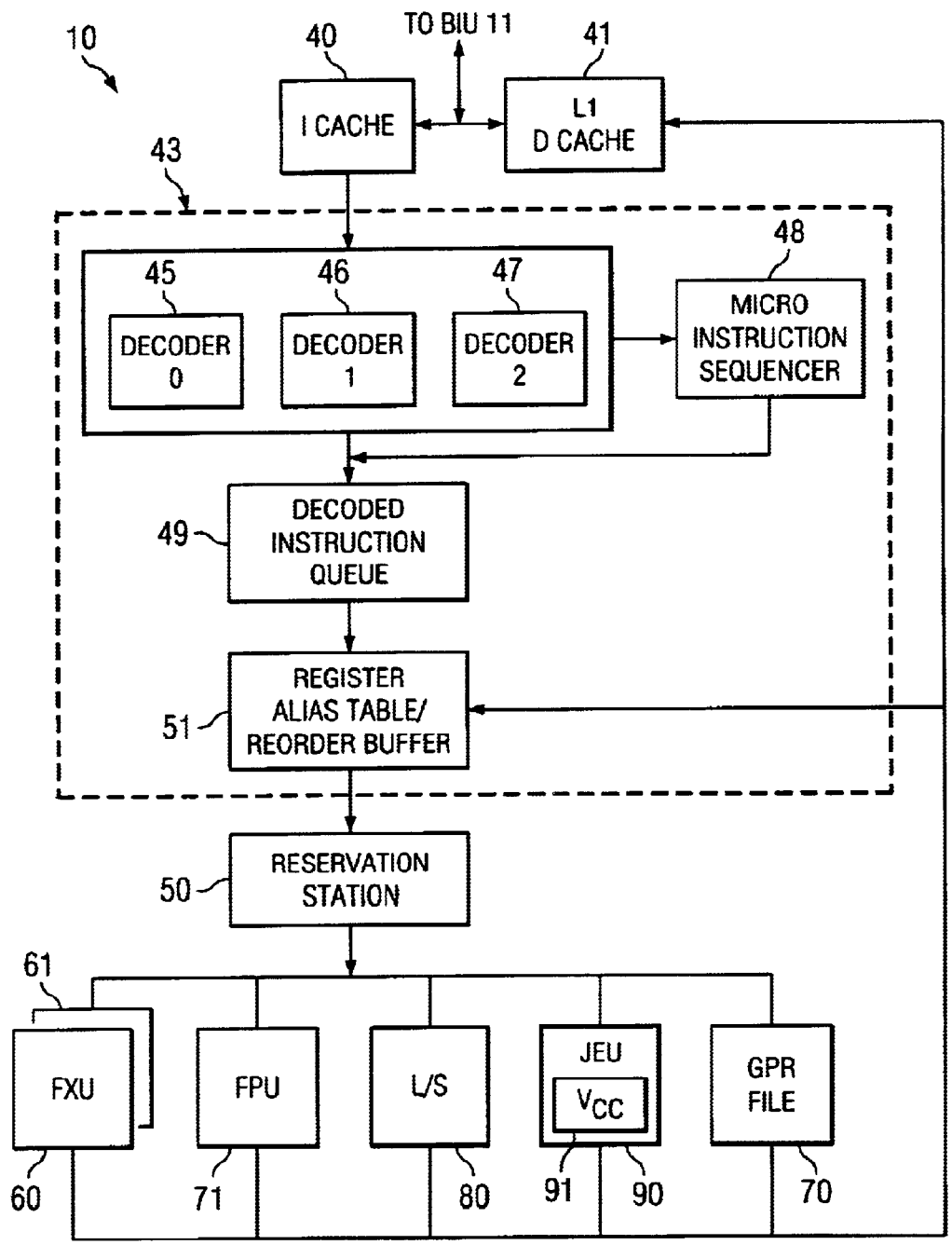
FIG. 3 is a more detailed block diagram of the decode unit of the microprocessor of FIG. 2 showing a preferred embodiment of the present invention wherein the microprocessor instructions are decoded into RISC micro-ops which utilize the value in the VCC register.

The operation of the present invention will now be described with reference to FIG. 3 which shows a more detailed view of the fetch/parse/decode/issue unit 43. More particularly, three (3) decode units (decoder 0, decoder 1, decoder 2) 45, 46, 47 are shown along with micro instruction sequencer unit 48. During the decode stage, between one and three instructions are submitted to decoders 45, 46, 47 for translation into micro-ops. Decoder 0 is a complex decoder that can decode any instruction that is not greater than seven bytes and that translates into no more than four micro-ops. Decoders 1 and 2 are simple decoders that can decode instructions that are not greater than seven bytes in length and that translates into a single micro-op. It can be seen that depending on the type of instruction, up to three instructions can be decoded at the same time.

Some instructions will translate into more than four micro-ops and cannot be handled by decoder 0. These instructions are submitted to the micro instruction sequencer (MIS) unit 48 for translation. Basically, MIS 48 is a microcode ROM that contains the series of micro-ops (five or more) associated with each very complex instruction.

After translation by decoders 45, 46, 47 or MIS 48, the micro-ops are placed in the decoded instruction queue 49. Decoded instruction queue 49 can hold up to six (6) micro-ops to handle the best-case scenario when an instruction that translates into four micro-ops is input to complex decoder 0 and instructions that translate into single micro-ops are input to simple decoders 1 and 2. This situation will yield six parallel micro-ops.

Register alias table/reorder buffer 51 includes a table that allows 40 hidden registers to be accessed and used by the micro-ops. The register alias table (RAT) will adjust the source fields of the micro-ops to select which of the 40 registers in the reorder buffer (ROB) are to be used. This mechanism essentially allows the eight (8) general purpose registers to be increased which will increase microprocessor performance.

After RAT/ROB unit 51 the micro-ops are provided to reservation station 50 and sent to the execution units for processing. Results generated by execution of the micro-ops are then provided to GPR file 70, ROB 51 or memory (data cache 41). Memory shelf 44 is not shown in FIG. 3.

The present invention utilizes the translation mechanism, e.g. decode unit 43 of the microprocessor to redirect various ones of the instructions to the virtual condition code.

For the purpose of describing the present invention, the LOOP instruction of the Intel ISA will be used. However, it should be understood that the use of the virtual condition code by other Intel architecture (IA) instructions is contemplated by the scope of the present invention.

As noted above, a LOOP instruction will decrement a count register and then jump to a target address based on the value in the count register. That is, the target address will be accessed for non-zero values and the loop will be exited when the count register is zero.

The LOOP instruction will be translated into outcome specific operations, such as decrement and jump micro-ops by decode unit 43. More specifically, a DEC ECX (ECX=ECX−1) and a JECXZ (jump when ECX=0) or a JCXZ (jump when CX=0) will be output by decode unit 43. The JECXZ micro-op will be required to check every bit of the 32 bit ECX register in order to determine if the value in the register is zero. Similarly, a JCXZ instruction will check the 16 bits in the CX register to test for zero. It is possible that the most significant bit (MSB) could be a "1" with the remaining bits all equal to zero. In this example JECXZ would check the first 31 bits and find that all zeros are present, however, the present of a "1" in the MSB location will cause the branch to be taken.

In accordance with a preferred embodiment of the present invention, decode 43 will cause a JNZ (jump if not zero), or the like to replace the J(E)CXZ micro-op. A JNZ instruction will branch to a target address when the ZF flag (condition code) in the flags register is set (equal to "1"), i.e. jump ZF target address. However, this instruction utilizes the flags register forcing the software to save and then restore the contents of the processor registers. The present invention then causes the condition code field to be adjusted to the virtual condition code register 91. In a preferred embodiment of the present invention VCC register 91 is located in the jump execution unit 90. This placement will allow for the jump instructions, which frequently use the virtual condition code, to have very fast access the VCC register. Of course, VCC register 91 could be placed in other areas of the microprocessor, such as the reorder buffer unit, fixed point unit, or other the like.

After the condition code field of the JNZ micro-op is adjusted it will utilize the value in the VCC register to determine whether to take a particular action, such as continue to branch to the target address, or exit the loop. The adjusted instruction will have a format such as JNZ, VCC, target address. In this manner the present invention allows a single comparison to be made in order to determine when to exit out of the loop.

Another IA instruction that will benefit from the virtual condition code of the present invention is the LOOPcc instruction. In this case it is determined when to exit the loop by looking at one of two conditions. That is, whether the value in the (E)CX register is zero or the ZF condition code is clear. In this case decode unit 43 will translate the LOOPcc instruction into at least four (4) micro-ops, i.e. DEC (E)CX, J(E)CXZ, OR, JNZ. More particularly, the (E)CX register can be decremented and the jump (E)CX=0 instruction will then check if the value in the register is zero (requiring a comparison for each of the 32 bits, or 16 bits if the CX register is used). Next, the jump ZF instruction will check the ZF condition code and if either the (E)CX register is zero or the ZF condition code is cleared ("0"), as determined by an OR instruction, then the loop is exited.

In accordance with the present invention, the LOOPcc instruction will be translated into DEC (E)CX, JNZ (VCC), OR JNZ (ZF) micro-ops. In this case, the first JNZ micro-op will have its condition code field adjusted to check the virtual condition code register 91, i.e. jump VCC target address. The (E)CX count register will be decremented to maintain compatibility with the ISA, since it is visible to the software, then the first jump micro-op will check the VCC register. The second jump instruction will check the ZF flag and if either VCC or ZF is clear, as determined by the OR instruction, then the loop will be exited. It can be seen that the jump VCC instruction will save the processing overhead required to check each bit in the (E)CX register, while maintaining the program visible registers in compliance with the ISA.

Additional instructions that can take advantage of the present invention include a family of "repeat" instructions that begin with the REP prefix. That is, a repeat instruction repeats a string instruction the number of times specified in the count register (E)CX (until the value in the register equals zero), or until the condition code in the ZF flag is met.

Further, the repeat (REP) instructions will continue execution of the string operation, such as a load string, or the like, based on the value in the count register. It should be noted that string operations are just one type of instruction(s) that can be repeated using the REP type instructions. However, those skilled in the art will understand that it may be desirable to repeat many other instructions in the instruction set architecture to perform various other processing functions.

Repeat while equal (REPE) instructions cause an operation to be repeated while certain values are the same, but cease branching when the values are not equal. Similarly, repeat while not equal (REPNE) will continue repeating the target instruction(s) while certain values are not equal.

Repeat while zero (REPZ) will continue repeating the target instruction(s) while the count register is zero or the ZF flag is clear (set=zero). The repeat while not zero (REPNZ) instruction will continue executing a target instruction(s) while either the count register is not equal to zero or the ZF flag is set (equal to one). In both cases the repeat type instructions will cause the string instruction, or the like to continue to be executed until the particular condition is met.

An example of a string operation will now be described. A load string operation may be used to load one (1) byte words to two (2) byte double words from the pointer pointed by register DS to the AX (one byte) or EAX (two byte) general purpose register. A repeat (REP) instruction will then be translated, or decoded into decrement and jump micro-ops by decode unit 43. That is, when ECX is used as the count register DEC ECX (ECX=ECX−1) and JECXZ (jump when ECX=0) will be output from unit 43. Again, each bit in the count register will need to be checked for a zero (0) value. In accordance with the present invention, a JNZ (jump not zero) instruction will be used to check the virtual condition code (VCC). Decode unit 43 will adjust the condition code field in the jump instruction, e.g. JNZ or the like to check the VCC, instead of the count register. As noted above, the count register will still need to be decremented since it is programmer (software) visible. In this case, so long as VCC does not equal zero, the repeat instruction will branch to the load string operation and continue loading words from the pointer pointed by the DS register to the (E)CX general purpose register. Thus, it can be seen that this additional preferred embodiment will also reduce processing overhead since a condition code (one bit) is checked instead of the 32 (or 16 bits in the case of CX) bits in the ECX count register.

Similarly, a repeat not zero (REPNZ) instruction can advantageously utilize the present invention. In this case, the repeat instruction will check both the count value in the (E)CX register and the ZF condition code, and continue repeating the target instruction(s), e.g. load string, until either ECX=0 or ZF=0. When ECX=0 or ZF=0, the operation will cease repetition of the string operation and continue processing down the fetched instruction path. In accordance with the present invention, decode unit 43 will adjust the J(E)CXZ jump instruction so that the virtual condition code of the present invention is checked rather than each bit of the count register (E)CX, thus providing a significant saving in processing overhead.

One aspect of the present invention is the ability of a microprocessor to set and/or clear the virtual condition code bit. In a preferred embodiment of the present invention a micro-op is used to set and/or clear the virtual condition code. This micro-op is issued by decode unit 43 in conjunction with the count register decrement instruction. That is, while the count register is being decremented, the virtual condition code is set. Thus, while the (E)CX register is being decremented, the virtual condition code is equal to one (VCC=1). During this time, a JNZ jump instruction, or the like associated with, e.g. a LOOP or REP instruction will check VCC and find that it is equal to one (1) and either loop back to the target instruction in the loop being executed, or repeat a target instruction, such as a string operation. However, when the count register (E)CX is no longer decremented, i.e. the value is zero, then a micro-op which resets VCC to zero is executed. Thus, the jump not zero instruction, or the like will see a zero (0) as the condition code (VCC) and cause the branch not to be taken such that processing will continue down the instruction stream path, rather than looping back to a target instruction or repeating a previous instruction.

A further example of the operation of the present invention will now be described using actual IA instructions. In this case, a programmer wants to perform the function of loading a twenty (decimal) byte string from memory. The following instructions will be used.

MOV CX, 20 (this instruction will set the count value in the CX register to the string count value of 20, binary 0000000000010100).

REP LODS AL (this instruction will load a byte from pointer [SI] into the AL register).

To execute the REP LODS AL instruction, the present invention operates in the following manner.
1. During the instruction decode stage, the original x86 REP instruction is converted to a RISC micro-operation.
2. A bit in the RISC micro-operation is adjusted (use_VCC) to indicate that the virtual condition code is to be used.
3. The REP LODS AL instruction is microcoded, as follows:
   a. Load the pointer value SI into a temporary register T1.
   b. Generate a load byte RISC operation using SI as a pointer.
   c. Decrement the CX register by one. This decrementing is carried out by a decrementer in one of the arithmetic logic units, i.e. fixed point units 60, 61.
   d. Set the VCC to one if the value in CX is zero and exit the loop (or cease repeating the string operations). VCC will be zero while CX is not zero and VCC will be set to one when CX is zero.
   e. If CX is not equal to zero, increment the pointer SI and to back to step "a".

In this manner, the loop/repeat is executed using the virtual condition code (VCC) without affecting the architecturally visible flags, i.e. ZF in the flags register.

Although certain preferred embodiments have been shown and described, it should be understood that many changes and modification may be made therein without departing from the scope of the appended claims.

What is claimed is:

1. A microprocessor having a user application program running thereon, comprising:
   an execution unit for processing a plurality of microprocessor instructions;
   a register, inaccessible to said user application program and accessible to selected ones of said plurality of microprocessor instructions generated by said user application program, for storing an indicator; and
   means for adjusting at least one of said plurality of microprocessor instructions according to a state of said indicator.

2. A microprocessor according to claim 1 wherein said adjusted one of said plurality of microprocessor instructions causes said particular action to be taken independent of any other said plurality of microprocessor instructions.

3. A microprocessor according to claim 2 further comprising a count register accessible to said user application program.

4. A microprocessor according to claim 3 wherein said plurality of microprocessor instructions comprise decrementing said count register and determining if a value in said count register equals zero.

5. A microprocessor according to claim 4 wherein said adjusted one of said plurality of microprocessor instructions is a jump instruction.

6. A microprocessor according to claim 5 wherein said means for adjusting comprises an instruction decode unit.

7. A microprocessor according to claim 6 wherein said instruction decode unit substitutes a jump instruction dependent on said indicator for a jump instruction dependent on said count register value.

8. A microprocessor according to claim 7 wherein said particular action is taken based on said indicator.

9. A microprocessor according to claim 8 wherein said indicator is set by an operation in accordance with said decrementing operation.

10. A microprocessor according to claim 6 further comprising a software accessible flags register for storing a plurality of condition codes including a zero flag condition code.

11. A microprocessor according to claim 10 wherein said adjusted one of said plurality of microprocessor instructions comprises a first jump instruction dependent on said count register value and a second jump instruction dependent on said zero flag condition code.

12. A microprocessor according to claim 11 wherein said instruction decode unit substitutes a jump instruction dependent on said indicator for said first jump instruction.

13. A microprocessor according to claim 12 wherein said jump instruction substitution is made based upon either said indicator stored in said register or said zero flag condition code.

14. A microprocessor according to claim 13 wherein said at least one microprocessor instruction comprises a loop instruction or a repeat instruction.

15. A microprocessor having a user application program running thereon, comprising:
   an execution unit for processing a plurality of microprocessor instructions;
   a register, inaccessible to said user application program and accessible to selected ones of said plurality of microprocessor instructions generated by said user application program, for storing an indicator; and
   an instruction decode unit that adjusts one of said outcome specific operations according to a state of said indicator.

16. A microprocessor according to claim 15 wherein said adjusted one of said plurality of microprocessor instructions causes said particular action to be taken independent of any other of said output specific operations.

17. A microprocessor according to claim 16 further comprising a count register accessible to said user application program.

18. A microprocessor according to claim 17 wherein said adjusted one of said plurality of microprocessor instructions is a jump instruction.

19. A microprocessor according to claim 18 wherein said instruction decode unit substitutes a jump instruction dependent on said indicator for a jump instruction dependent on said count register value.

20. A method of executing microprocessor instructions output from a user application program running on a microprocessor, comprising the steps of:
   processing, by an execution unit in said microprocessor, a plurality of microprocessor instructions;
   storing an indicator in a register which is not accessible to said user application program and is accessible to selected ones of said plurality of microprocessor instructions generated by said user application program; and
   adjusting, by an instruction decode unit, at least one of said plurality of microprocessor instructions according to a state of said indicator.

21. A method according to claim 20 further comprising the step of causing, by said adjusted one of said plurality of microprocessor instructions, a particular action to be taken independent of any other of said output specific operations.

22. A method according to claim 21 further comprising the step of providing a count register accessible to said user application program.

23. A method according to claim 22 wherein said step of processing said plurality of microprocessor instructions further comprise the steps of decrementing said count register and determining if a value in said count register equals zero.

24. A method according to claim 23 wherein said adjusted one of said plurality of microprocessor instructions is a jump instruction.

25. A method according to claim 24 wherein said step of adjusting further comprises the step of substituting a jump instruction dependent on said indicator for a jump instruction dependent on said count register value.

26. A method according to claim 25 further comprising the step of implementing said particular action based on said indicator.

27. A data processing system, including a microprocessor, having a user application program running thereon, comprising:

an interface unit for exchanging information with said user application program;

at least one execution unit for processing a plurality of microprocessor instructions, including a jump operation;

a register, inaccessible to said user application program and accessible to selected ones of said plurality of microprocessor instructions generated by said user application program, for storing an indicator; and an instruction decode unit for adjusting said selected ones of said plurality of microprocessor instructions generated by said user application program, including said jump operation;

wherein a result of said processing of said selected ones of said plurality of microprocessor instructions is output to said software program by said interface unit.

28. A microprocessor operable to execute application programs, said microprocessor comprising:

a register that stores an indicator having a plurality of states; and circuitry that executes microprocessor instructions generated in response to said executing application program, said circuitry operable to adjust ones of said microprocessor instructions according to a state of said indicator.

29. The microprocessor set forth in claim 28 wherein said circuitry comprises an execution unit operable to execute said microprocessor instructions.

30. The microprocessor set forth in claim 28 wherein said register is inaccessible to said application program.

31. The microprocessor set forth in claim 28 wherein said register is accessible to ones of said microprocessor instructions.

32. The microprocessor set forth in claim 31 wherein said ones of said microprocessor instructions are generated by said application program.

33. The microprocessor set forth in claim 28 wherein said adjusted ones of said microprocessor instructions cause particular actions independent of any other said microprocessor instructions.

34. The microprocessor set forth in claim 28 wherein said circuitry comprises an instruction decode unit.

35. The microprocessor set forth in claim 34 further comprising a count register that maintains a count register value.

36. The microprocessor set forth in claim 35 wherein said instruction decode unit is operable to substitute a jump instruction dependent on said indicator for a jump instruction dependent on said count register value.

37. The microprocessor set forth in claim 36 wherein one of said adjusted ones of said microprocessor instructions comprises a first jump instruction dependent on said count register value and a second jump instruction dependent on a zero flag condition code.

38. A data processing system comprising:

an interface unit for exchanging information with an application program executing on said data processing system; and a microprocessor operable to execute said application program, said microprocessor comprising:
a register that stores an indicator having a plurality of states; and
circuitry that executes microprocessor instructions generated in response to said executing application program, said circuitry operable to adjust ones of said microprocessor instructions according to a state of said indicator.

39. The data processing system set forth in claim 38 wherein said circuitry comprises an execution unit operable to execute said microprocessor instructions.

40. The data processing system set forth in claim 38 wherein said register is inaccessible to said application program.

41. The data processing system set forth in claim 38 wherein said register is accessible to ones of said microprocessor instructions.

42. The data processing system set forth in claim 41 wherein said ones of said microprocessor instructions are generated by said application program.

43. The data processing system set forth in claim 38 wherein said adjusted ones of said microprocessor instructions cause particular actions independent of any other said microprocessor instructions.

44. The data processing system set forth in claim 38 wherein said circuitry comprises an instruction decode unit.

45. The data processing system set forth in claim 44 wherein said microprocessor further comprises a count register that maintains a count register value.

46. The data processing system set forth in claim 45 wherein said instruction decode unit is operable to substitute a jump instruction dependent on said indicator for a jump instruction dependent on said count register value.

47. A method of operating a microprocessor to execute an application program, said method of operation comprising the steps of:

storing an indicator having a plurality of states in a register;

executing microprocessor instructions generated in response to said executing application program;

adjusting (i) a count register value and (ii) ones of said microprocessor instructions according to a state of said indicator; and selectively substituting jump instruction dependent on said indicator for jump instructions dependent on a count register value.

* * * * *